United States Patent [19]

Saito

[11] Patent Number: 5,640,631

[45] Date of Patent: Jun. 17, 1997

[54] FINDER SYSTEM OF A SINGLE LENS REFLEX CAMERA

[75] Inventor: Masato Saito, Tokyo, Japan

[73] Assignee: Asahi Kogaku Kogyo Kabushiki Kaisha, Tokyo, Japan

[21] Appl. No.: 356,637

[22] Filed: Dec. 15, 1994

[30] Foreign Application Priority Data

Dec. 20, 1993 [JP] Japan .................. 5-320482

[51] Int. Cl.$^6$ .................................................. G03B 13/10
[52] U.S. Cl. ........................................................ 396/380
[58] Field of Search ............................... 354/222; 396/380

[56] References Cited

U.S. PATENT DOCUMENTS

| | | |
|---|---|---|
| 2,149,384 | 3/1939 | Becker . |
| 2,157,548 | 5/1939 | Leitz . |
| 2,943,549 | 7/1960 | Nerwin . |
| 3,033,072 | 5/1962 | Miller et al. . |
| 5,159,372 | 10/1992 | Nomura et al. . |
| 5,255,030 | 10/1993 | Mukai et al. . |
| 5,307,111 | 4/1994 | Kurei . |
| 5,345,285 | 9/1994 | Hasushita et al. . |

*Primary Examiner*—David M. Gray
*Attorney, Agent, or Firm*—Greenblum & Bernstein P.L.C.

[57] ABSTRACT

A finder system of a single lens reflex camera provided with a mechanism for defining a viewing area of the finder system when the camera is in a first predetermined mode. When the camera is in a second predetermined mode, a mechanism is provided for shading a predetermined portion of the viewing area of the finder system with the light shading mechanism having at least one light shielding plate. The finder system also includes a mechanism for changing the camera form the first predetermined mode to the second predetermined mode.

18 Claims, 9 Drawing Sheets

FINDER SYSTEM OF A SINGLE LENS REFLEX CAMERA

BACKGROUND OF THE INVENTION

The present invention relates to a finder system of an SLR (single lens reflex) camera. More specifically, the present invention relates to a finder that has a mechanism for changing a size of a viewing area of the finder system.

Recently, some conventional SLR cameras can change a photographing mode from a normal mode (film exposure area 36 mm×24 mm for a 35 mm camera) to a panoramic mode (film exposure area 36 mm×13 mm). In order to indicate a portion of the viewing area which corresponds to the panoramic mode, the conventional SLR has a pair of parallel lines formed on a focusing plate of the finder system. However, since these lines are always visible, and the entire viewing area is always visible, there is no indication given in the finder system as to mode (i.e., normal or panoramic) of operation of the camera. This may result in the photographer not framing the picture properly, since he may not realize the mode of operation of the camera.

SUMMARY OF THE INVENTION

It is therefore an object of the present invention to provide a finder system for an SLR camera in which a viewing area seen in the finder system corresponds to an exposure area of the film.

According to an aspect of the present invention, there is provided a finder system of a single lens reflex camera, the finder system comprising a mechanism for defining a viewing area of the finder system when the camera is in a first predetermined mode, means for shading a predetermined portion of the viewing area of the finder system when the camera is in a second predetermined mode, and a shading plate for changing the camera from the first predetermined mode to the second predetermined mode. The shading means includes at least one light shielding plate.

Alternatively, the shading plate comprises a plurality of light shielding plates which are arranged into two groups. Further, the plurality of light shielding plates in each group completely overlap each other when the camera is in the first predetermined mode.

Further, when the finder system is in the second predetermined mode, the plurality of light shielding plates in each of the groups partially overlap each other, thereby changing a size of the viewing area.

Preferably, the knob which changes the finder system moves at least one of the plurality of light shielding plates, the knob being accessible from outside a casing of said camera.

According to another aspect of the present invention, there is provided a finder system of a single lens reflex camera, a viewing area of the finder system adjustable between a first and second predetermined size by a light shading plate, the light shading plate comprising a plurality of light shielding plates stacked one on top of another.

Preferably the plurality of light shading plates are arranged into first and second groups. When the view finder has the first predetermined size, each of the light shielding plates of the first group completely overlap each other, and each of the light shielding plates of the second group completely overlap each other. Further, when the view finder has the second predetermined size, each of the light shielding plates of the first group partially overlap each other, and each of the light shielding plates of the second group partially overlap each other.

DESCRIPTION OF THE EMBODIMENTS

The present invention will now be described with reference to FIGS. 1 through 9.

Figure 1:
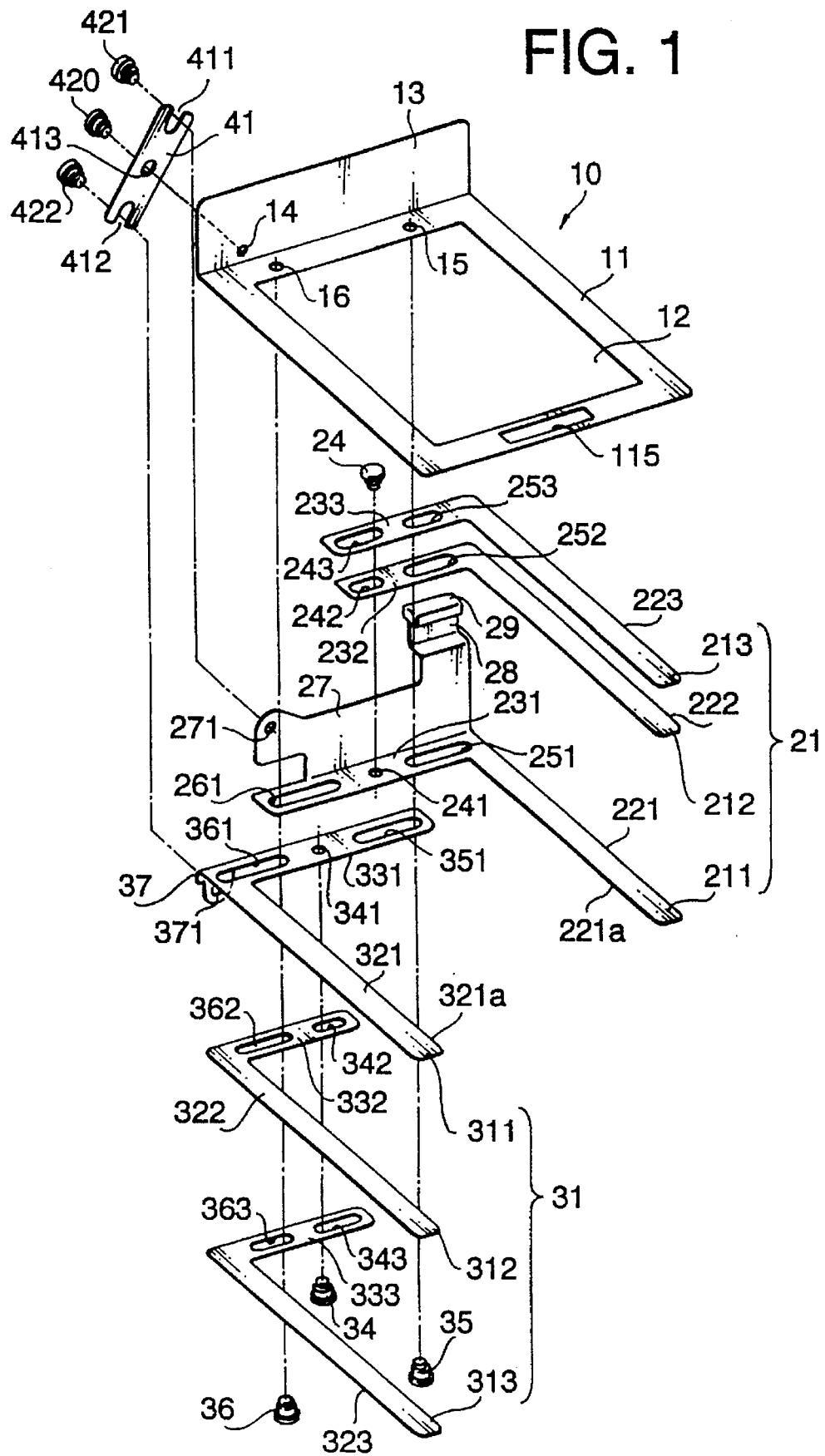
FIG. 1 is an exploded perspective view of a viewing area changing mechanism according to the present invention.

The finder system of an SLR camera of the embodiment is provided with a viewing area changing mechanism 10 as shown in FIG. 1. The viewing area changing mechanism 10 changes the viewing area of the finder between a normal viewing area corresponding to a normal mode of the camera and a panoramic viewing area corresponding to a panoramic mode of the camera.

The viewing area changing mechanism 10 consists of a field frame 11 that is fixed to the camera body, first and second light shielding plate groups 21 and 31 that are provided with three light shielding plates respectively, and an interlocking arm 41 for driving the second light shielding plate group 31 in accordance with the movement of the first light shielding plate group 21. The first and second light shielding plate groups 21, 31 and the interlocking arm 41 are attached to the field frame 11.

A field aperture 12 which is formed inside the field frame 11 defines the normal viewing area. In the following description, a direction along a long side of the field aperture 12 is defined as a long side direction, and a direction along a short side of the field aperture 12 that is perpendicular to the long side direction, is defined as a short side direction.

A guide plate 13 is formed at one short side of the field frame 11 and is perpendicular to the field frame 11. On the other short side of the field frame 11, a display window 115 is formed for display operating parameters of the camera such as shutter speed, lens aperture value etc.

The first light shielding plate group 21 has a first master plate 211 and first and second slave plates 212 and 213, respectively. The second light shielding plate group 31 has a second master plate 311 and third and fourth slave plates 312 and 313, respectively. All of the light shielding plates are connected to the field frame 11 and can slide along the short side direction.

The first master plate 211 is L-shaped and has a shading portion 221 extending in the long side direction and a guiding portion 231 extending in the short side direction. A side plate 27 is formed perpendicular to the guiding portion 231 of the first master plate 211 and is connected with a crank portion 28 on which an actuation knob 29 is attached. The first master plate 211 is connected to the field frame 11 using guide pins 35 and 36 that pass through sliding holes 251 and 261, respectively. The guide pins 35 and 36 are screwed to threaded holes 15 and 16, respectively formed on the field frame 11.

The first master plate 211 can slide along the short side direction of the field frame 11. The sliding amount of the first master plate 211 is determined by the length of the sliding holes 251 and 261 (defined as "3w", where "w" is a predetermined length).

The first and second slave plates 212 and 213 are also L-shaped thin plates and have shading portions 222 and 223, respectively, extending in the long side direction, and guiding portions 232 and 233, respectively, extending in the short side direction. The first and second slave plates 212 and 213 are positioned between the first master plate 211 and the field frame 11. The guide pin 35 passes through sliding holes 252 and 253 formed on the first and second slave plates 212 and 213, and a driving pin 24 passes through the sliding holes 243 and 242, and is fixed to a threaded hole 241 of the first master plate 211.

When the first master plate 211 is moved, the first and second slave plates 212 and 213 are driven by the driving pin 24 fixed to the first master plate 211.

The sliding amount of the first and second slave plates 212 and 213 are determined by the lengths of the sliding holes 252 and 253, and are defined as "2w" and "w", respectively.

The second master plate 311 is also L-shaped and has a shading portion 321 extending in the long side direction and a guiding portion 331 extending in the short side direction. A side projection 37 stands on the guiding portion 331 of the second master plate 311. The second master plate 311 is connected to the field frame 11 using the guide pins 35 and 36 that pass through the sliding holes 351 and 361, respectively.

The third and fourth slave plates 312 and 313 are also formed as L-shaped thin plates and have shading portions 322 and 323, respectively, extending in the long side direction and guiding portions 332 and 333, respectively, extending in the short side direction. The guide pin 36 passes through sliding holes 362 and 363 formed on the third and fourth slave plates 312 and 313, respectively. A driving pin 34 passes through sliding holes 342 and 343, respectively, and is fixed to a threaded hole 341 of the second master plate 311. Therefore, the third and fourth slave plates 312 and 313 are positioned under the second master plate 311 and are connected to the field frame 11.

When the second master plate 311 is driven, the third and fourth slave plates 312 and 313 are driven by the driving pin 34 fixed to the second master plate 311.

The sliding amount of the second master plate 311 is determined by the length of the sliding holes 351 and 361, and is equal to 3w. The sliding amounts of the third and fourth slave plates 312 and 313 are determined by the lengths of the sliding holes 342 and 343, respectively, and are equal to "2w" and "w", respectively.

The interlocking arm 41 is attached to the guide plate 13 of the field frame 11 by an axial pin 420 that is screwed to a threaded hole 14 so that the interlocking arm 41 can rotate about the axial pin 420. Both ends 411 and 412 of the interlocking arm 41 are formed as forks and hold first and second connecting pins 421 and 422. The first connecting pin 421 is screwed to a threaded hole 271 formed on the side plate 27 of the first master plate 211, and the second connecting pin 422 is screwed to a threaded hole 371 formed on the side projection 37 of the second master plate 311.

Since the interlocking arm 41 links the first and second master plates 211 and 311, when the first master plate 211 is driven in one direction along the short side direction, the second master plate 311 is moved in an opposite direction along the short side direction to the first master plate 211. As mentioned above, the slave plates 212, 213, and 312, 313, are driven by the master plates 211 and 311, respectively. Further, all of the plates are driven when a photographer moves the knob 29 along the short side direction.

Figures 2A, 2B:
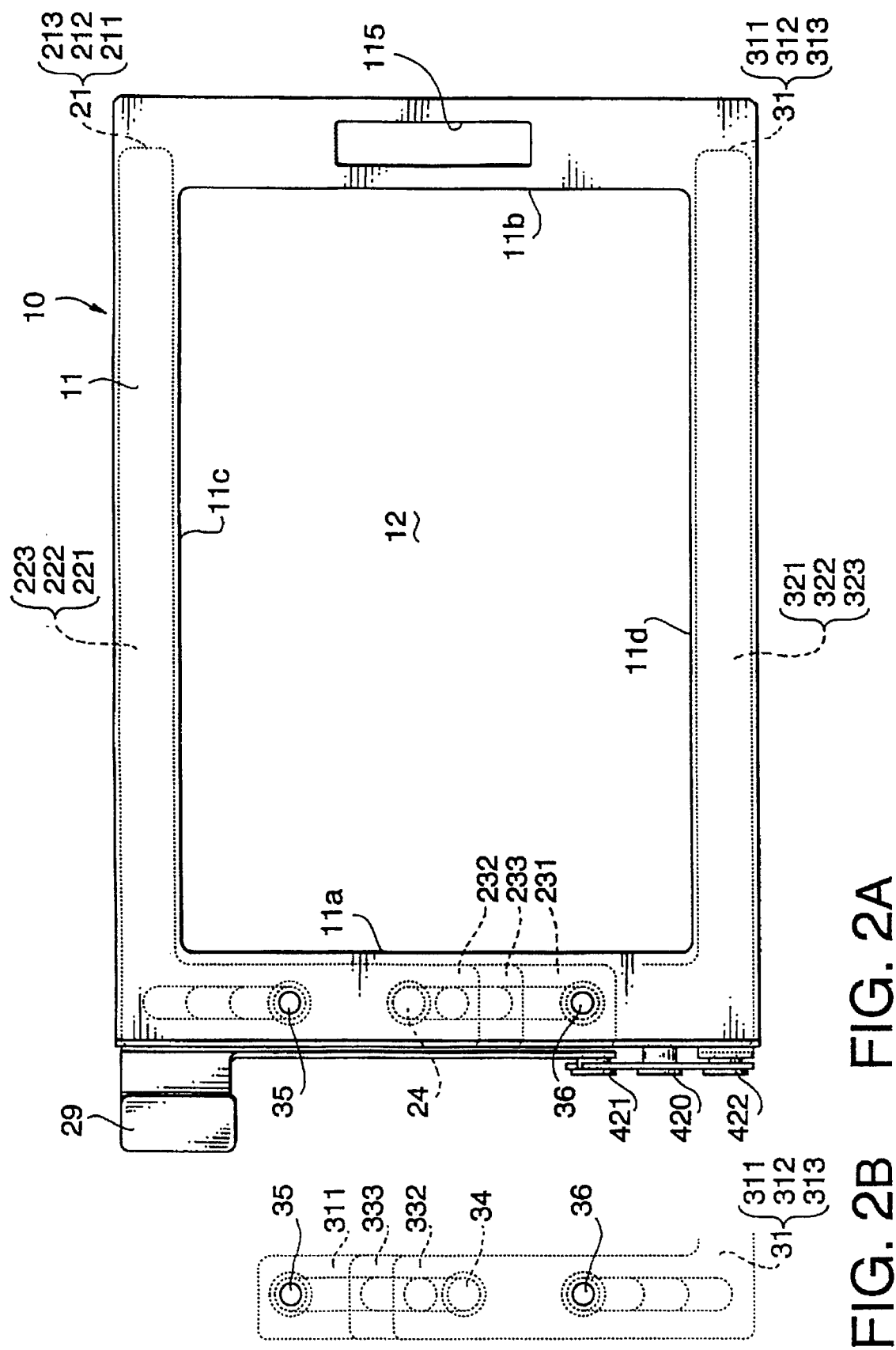
FIGS. 2(A) and 2(B) show top views of portions of the viewing area changing mechanism shown in FIG. 1, when a normal mode is selected.

FIG. 2(A) is a top view of the viewing area changing mechanism 10 when the knob 29 is in a position corresponding to the normal mode. FIG. 2(A) only shows the guiding portions 231, 232 and 233 of the first light shielding plate group 21. The guiding portions 331, 332 and 333 of the second light shielding plate group 31 are shown in FIG. 2(B). Further, as shown in FIGS. 2(A) and 2(B), the light shielding plate groups 21 and 31 are accommodated below the field frame 11 and do not protrude out of the area defined by the field frame 11, when the camera is in the normal mode. Therefore, the amount of space required by the finder system can be reduced.

When the knob 29 is positioned as shown in FIG. 2(A) the shading portions of all the light shielding plates are positioned outside the field aperture 12 of the field frame 11, and therefore the field aperture 12 is defined by inside boundaries 11a, 11b, 11c and 11d of the field frame 11.

Figures 3A, 3B:
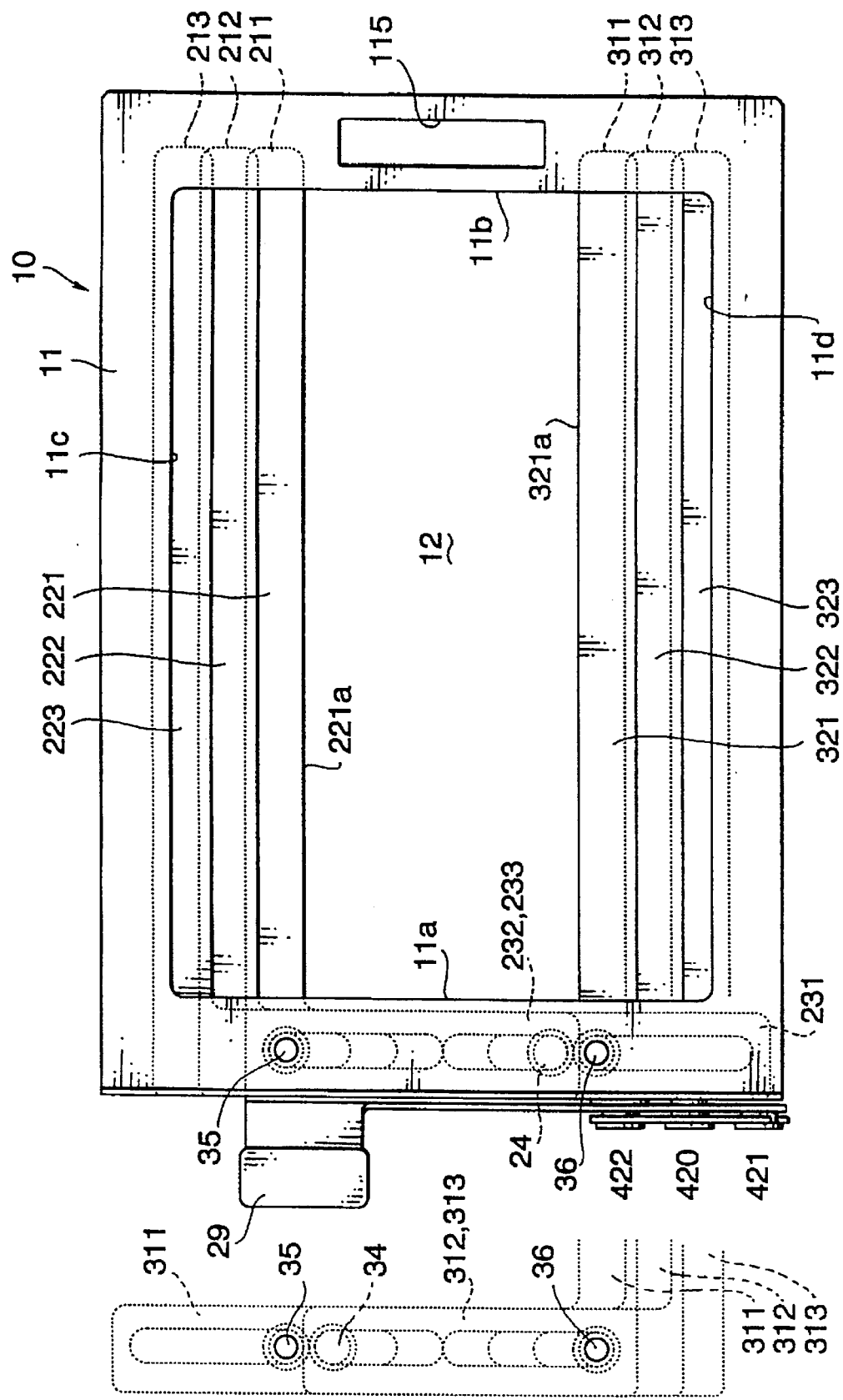
FIG. 3(A) and 3(B) show top views of portions of the viewing area changing mechanism shown in FIG. 1, when a panoramic mode is selected.

When the knob 29 slides downward in FIG. 2(A) and is in a position corresponding to a panoramic mode, as shown in FIG. 3(A), the shading portions of the all plates are moved into the field aperture 12 of the field frame 11, thereby reducing the area of the field aperture 12.

FIG. 3(A) shows the guiding portions 231, 232 and 233 of the first light shielding plate group 21, while FIG. 3(B) shows the guiding portions 331, 332 and 333 of the second light shielding plate group 31. As shown in FIG. 3(A), the field aperture 12 which defines a viewing area of the finder system in the panoramic mode is defined by the inside boundaries 11a and 11b of the short side of the field frame 11 and inside boundaries 221a and 321a of the first and second master plates 211 and 321, respectively.

Figure 4:
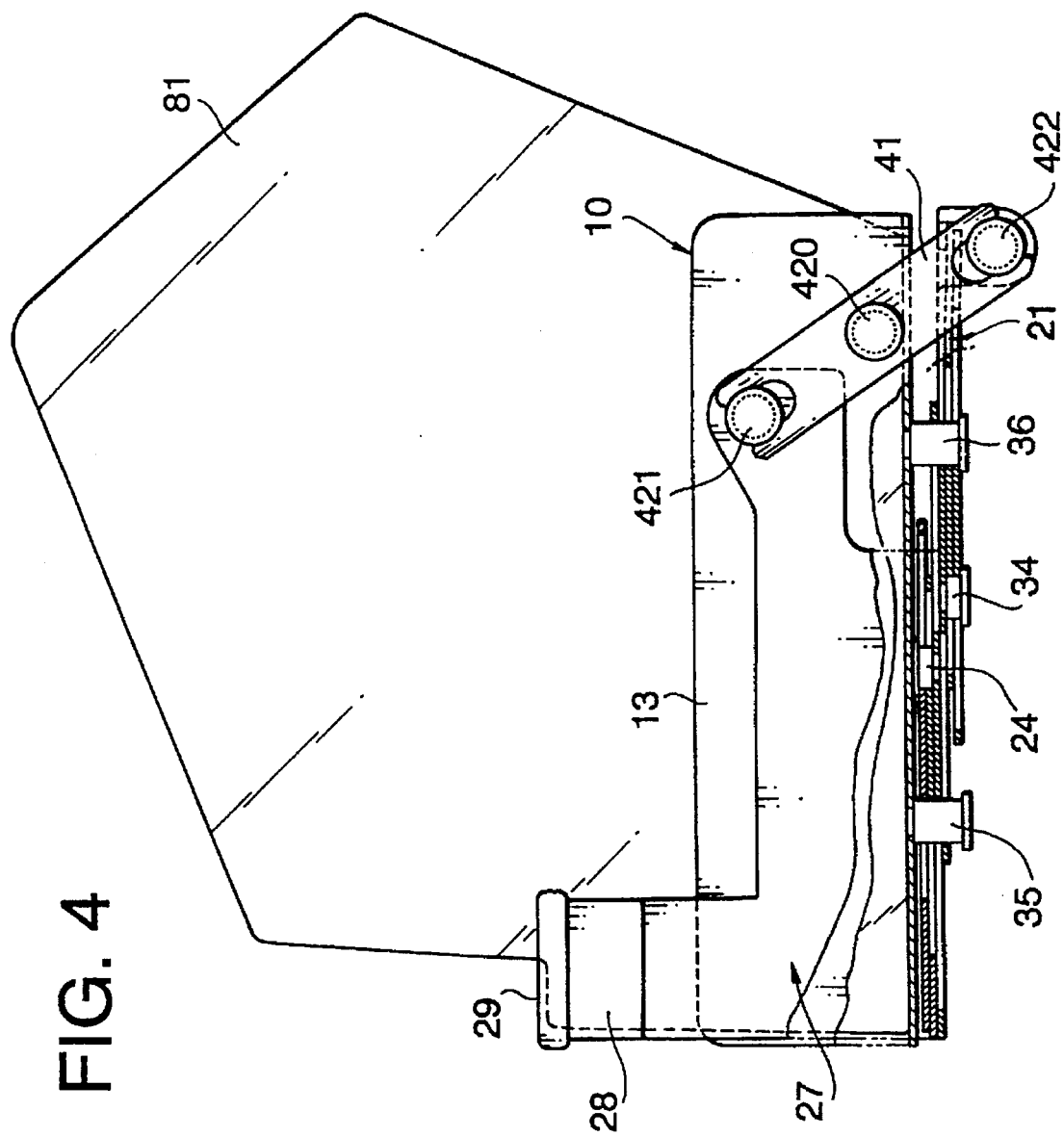
FIG. 4 is a side view of the viewing area changing mechanism shown in FIG. 1, when the normal mode is selected.
Figure 5:
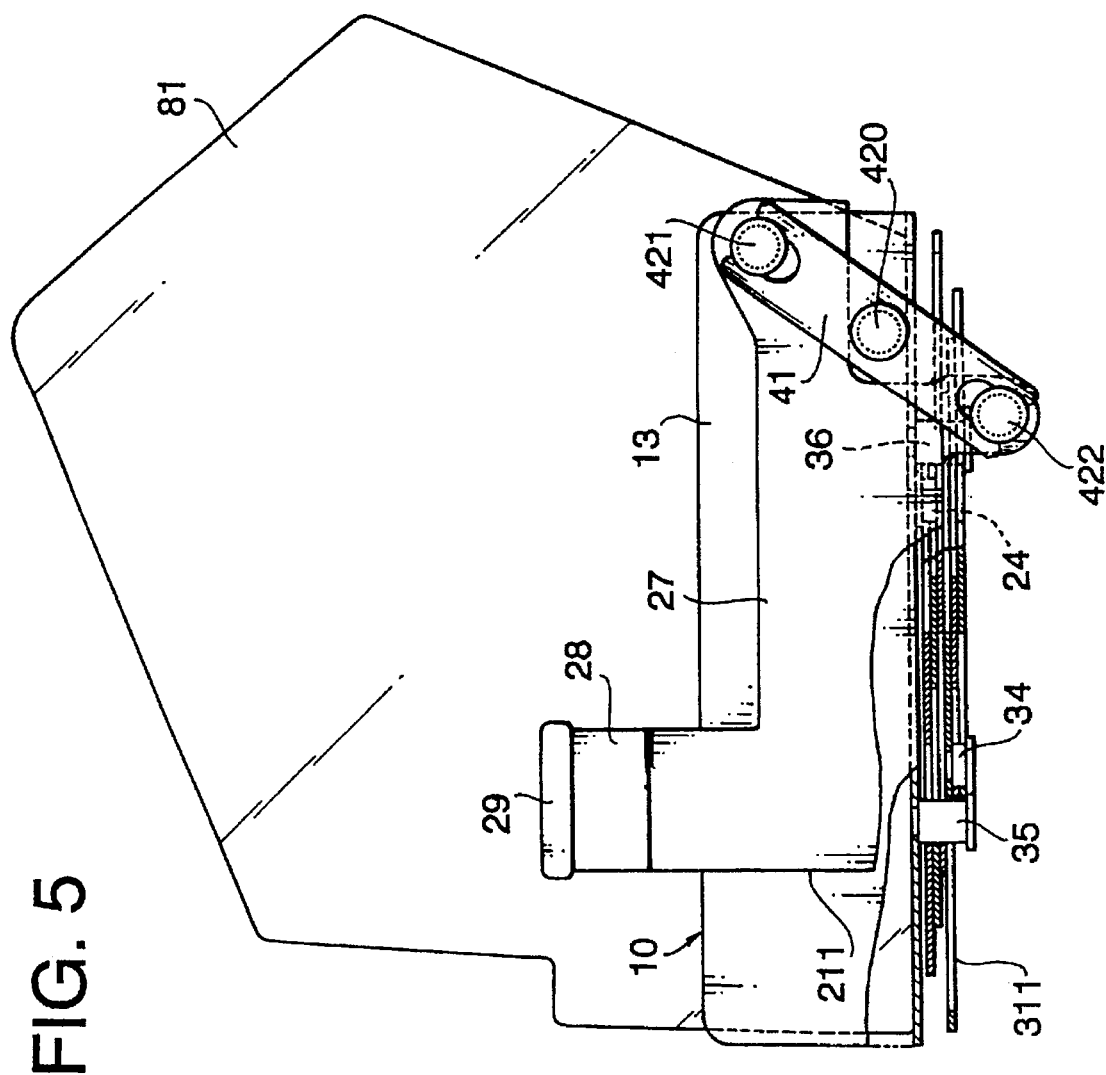
FIG. 5 is a side view of the viewing area changing mechanism shown in FIG. 1, when the panoramic mode is selected.
Figure 6:
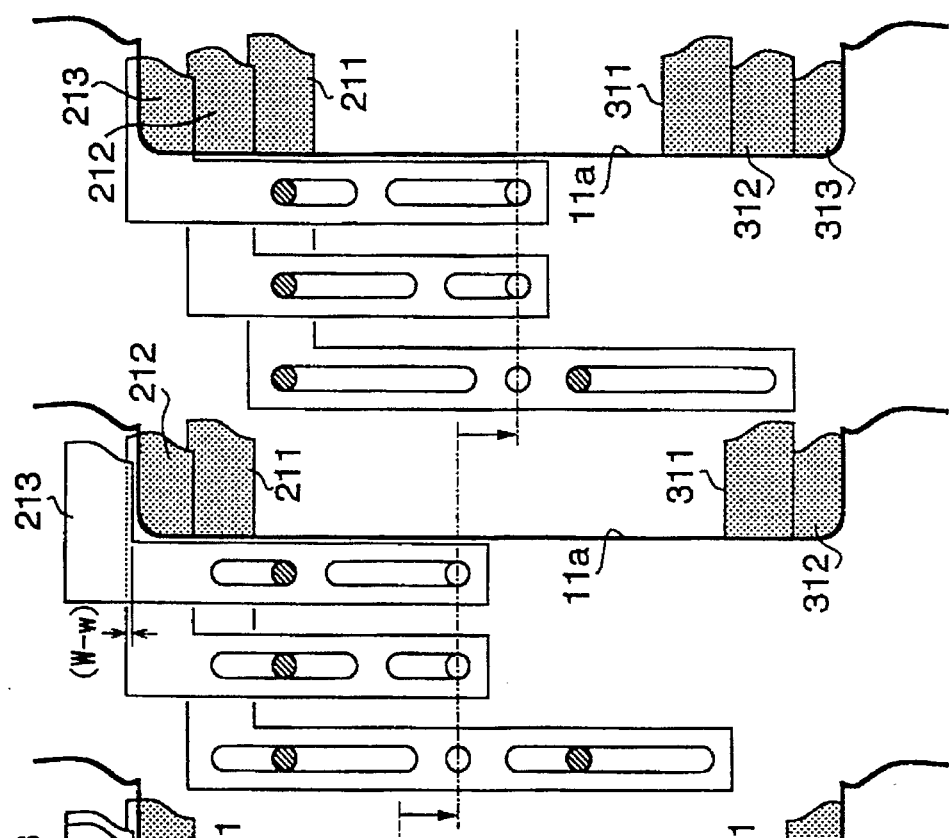
FIGS. 6(A) through 6(D) show a change in a viewing area of the finder from the normal mode to the panoramic mode.

FIG. 4 is a side view of the viewing area changing mechanism 10 and an erecting mirror unit 81 when the knob 29 has a position corresponding to the normal mode. FIG. 5 is a side view of the viewing area changing mechanism 10 and the erecting mirror unit 81 when the knob 29 has a position corresponding to the panoramic mode.

FIGS. 6(A) through 6(D) show a change in a viewing area of the finder system from the normal mode to the panoramic mode as the first light shielding plate group 21 is moved during movement of the knob 29. The guiding portions of the plates 211, 212 and 213 overlap one another in the actual construction of the viewing area changing mechanism 10. However, FIGS. 6(A) through 6(D) show the guiding portions of the plates 211, 212 and 213 shifted in the long side direction in order to show the movement of the plates more clearly.

The guide pins 35 and 36 remain fixed in FIGS. 6(A) through 6(D) and the plates 211, 212 and 213 are moved along the short side direction. The first and second slave plates 212 and 213 are driven by the driving pin 24 fixed to the first master plate 211.

In the following description, the widths of the shading portion 221, 222, 223 of each of the plates 211, 212 and 213, respectively, have the same width "W". Further, an overlapping width of each of the plates, when the panoramic viewing area is selected, is defined as "(W-w)". As mentioned above, the width "w" is equal to the sliding amount of the second slave plate 213.

Since the movement of the first and second light shielding plate groups 21 and 31 are symmetrical and similar to each other, only the movement of the first light shielding plate group 21 is described below.

FIG. 6(A) shows the normal mode. In the normal mode the guide pin 36 contacts a lower edge 261a of the sliding hole 261, and the guide pin 35 contacts lower edges 251a, 252a and 253a of the sliding holes 251, 252 and 253, respectively. Further, the driving pin 24 contacts upper edges 242b and 243b of the sliding holes 242 and 243, respectively. The first and second slave plates 212 and 213 remain stationary.

When the first master plate 211 is moved down by an amount "w" along the short side direction as shown in FIG. 6(B), the driving pin 24 contacts a lower edge 242a of the sliding hole 242 formed in the second slave plate 212. If the first master plate 211 is moved further down, the first slave plate 212 starts to move with the first master plate 211. The second slave plate 213 remains stationary.

When the first master plate 211 is further moved by an amount "w", (i.e., a total amount "2w" from the normal mode position of FIG. 6(A)), along the short side down direction as shown in FIG. 6(C), the driving pin 24 also contacts a lower edge 243a of the sliding hole 243 formed on the second slave plate 213. If the first master plate 211 is moved further down, the first slave plate 212 moves further down and the second slave plate 213 starts to move with the first master plate 211.

When the first master plate 211 is further moved by an amount "w", (i.e., a total amount "3w" from the normal mode position of FIG. 6(A)), along the short side down direction as shown in FIG. 6(D), the movement of all of the plates is stopped, because the guide pin 35 contacts the upper edges 251b, 252b and 253b, and the guide pin 36 contacts the upper edge 261b. Therefore, the plates 211, 212 and 213 enter into the aperture 12 of the field frame 11 in FIG. 6(D), and a viewing area corresponding to the panoramic mode is formed.

When the panoramic mode is changed to the normal mode, the first master plate 211 is moved in the reverse direction to that described above. Therefore, the master plate 211 is moved up along the short side direction. When the master plate 211 is moved up by an amount "w", the driving pin 24 contacts the upper edge 242b of the first slave plate 212. Further, when the master plate 211 is moved up by amount "2w", the driving pin 24 contacts the upper edge 243b of the second slave plate 213.

The first and second slave plates 212 and 213 are then moved by the driving pin 24. When the master plate 211 is moved by an amount "3w", all of the plates are located outside the aperture of the field frame 11 as shown in FIG. 6(A).

When the viewing area is changed between the normal viewing area and the panoramic viewing area, only the first master plate 211 is moved in the first "w" movement, only the first master plate 211 and the first slave plate 212 are moved in the second "w" movement, and all of the plates are moved together in the third "w" movement.

Figure 7:
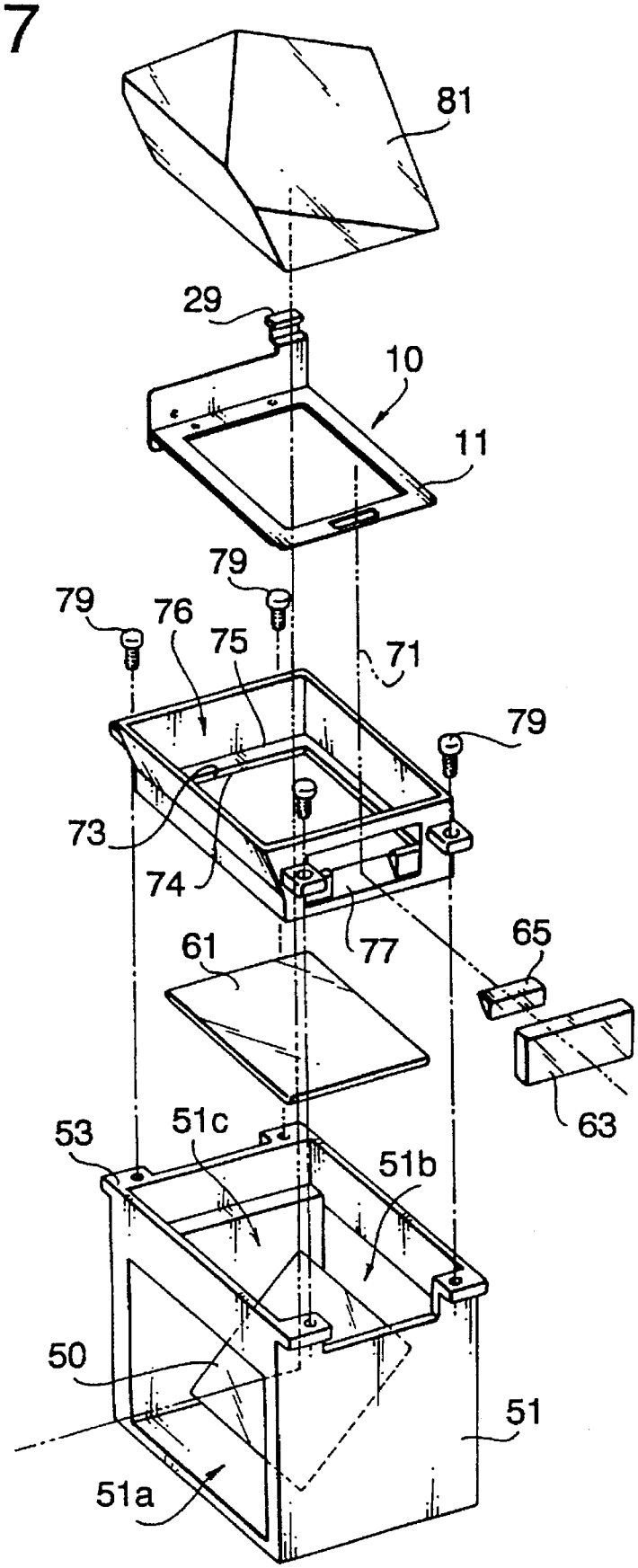
FIG. 7 is an exploded perspective view of the finder system which embodies the present invention.
Figure 8:
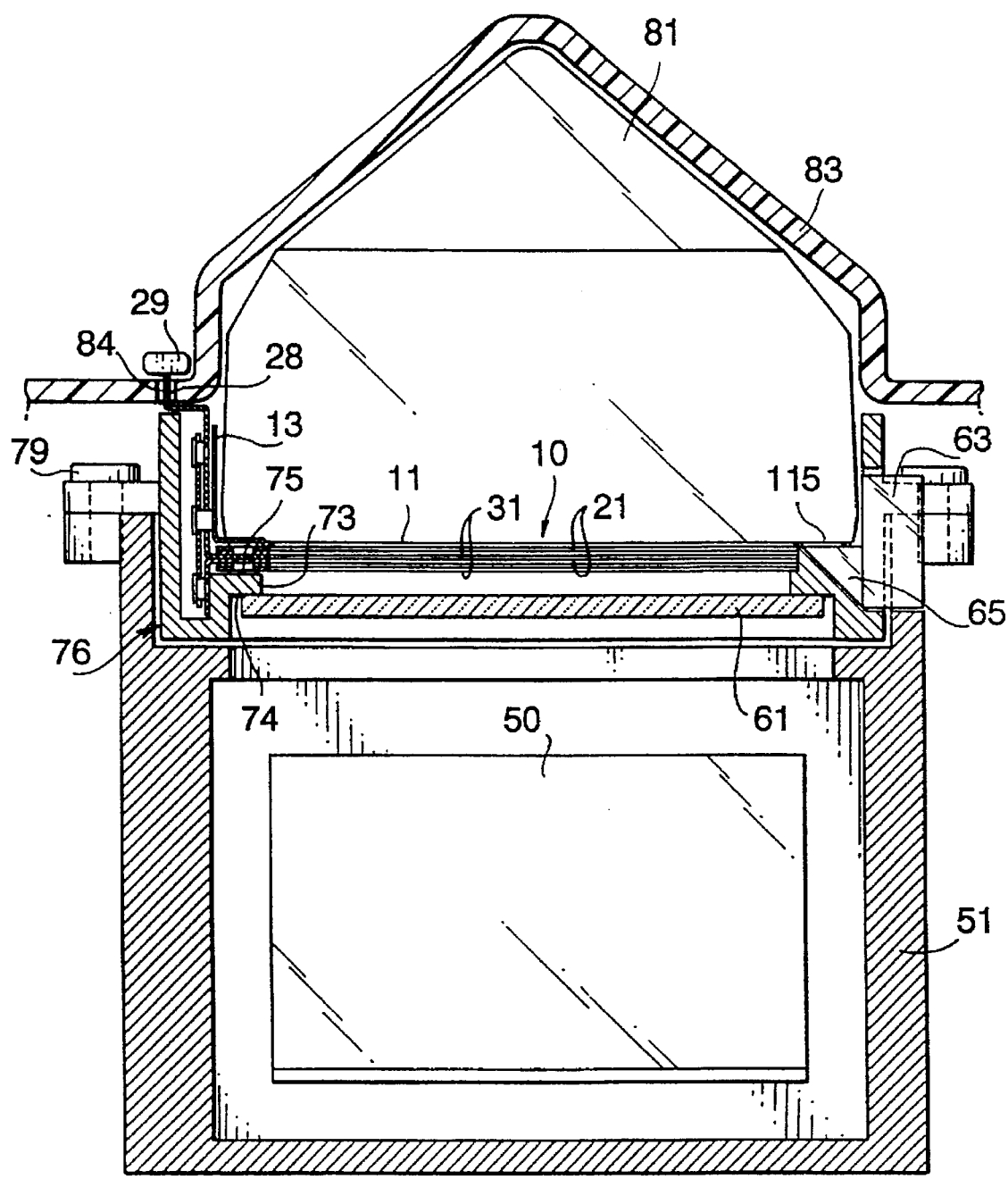
FIG. 8 is a front sectional view of the finder system shown in FIG. 7.
Figure 9:
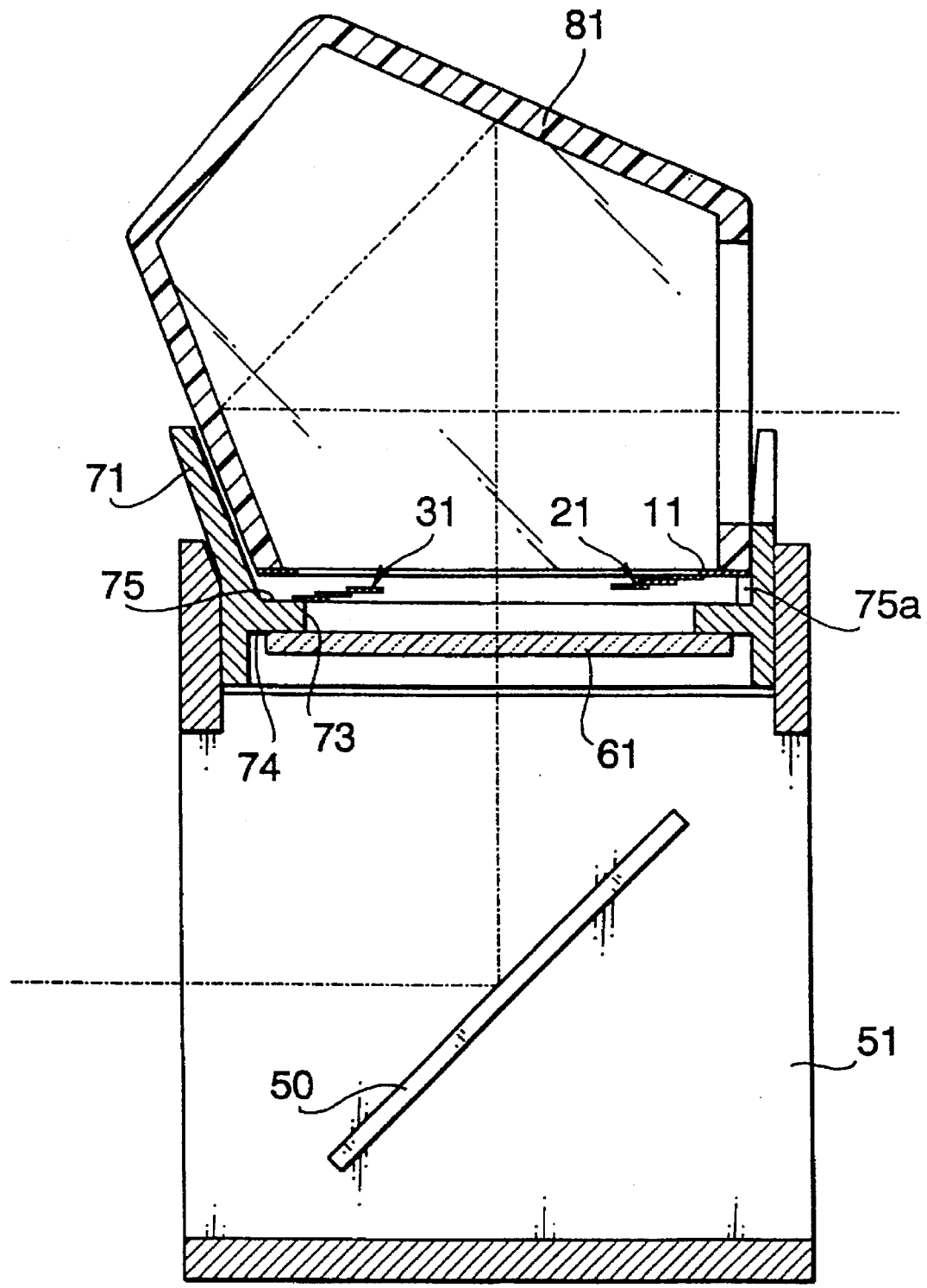
FIG. 9 is a side sectional view of the finder system shown in FIG. 7.

FIGS. 7 to 9 show a construction of a finder system of the SLR camera which incorporates the viewing area changing mechanism 10 of the present invention.

A quick-return mirror 50 that reflects light rays from an object to a finder system is mounted in a mirror box 51. The mirror box 51 has three openings 51a, 51b and 51c. The light rays from the object are incident through the first opening 51a and pass through the second opening 51b to a film (not shown) when the quick-return mirror 50 is in a taking position. The light rays are reflected by the quick-return mirror 50 and pass through the third opening 51c when the quick-return mirror 50 is in an observing position, as shown in FIG. 7.

An attachment frame 76 is fixed to the mirror box 51 by screws 79. A focusing plate 61 is attached to a lower side surface 74 of an inner flange 73 formed on the attachment frame 76. The viewing area changing mechanism 10 is mounted on an upper side surface 75 of the inner flange 73 of the attachment frame 76.

As shown in FIG. 9, a projection 75a is formed on the upper side surface 75 and contacts the field frame 11 of the viewing area changing mechanism 10. Further, the erecting mirror unit 81 is mounted on the attachment frame 76 and the viewing area changing mechanism 10.

A display prism 63 is attached to the attachment frame 76 so as to guide light emitted from a display 63 to the erecting mirror unit 81 through the window 115 formed on the field frame 11 along an optical axis 71.

The erecting mirror unit 81 is covered by a casing 83 of the camera. The casing 83 is provided with a through hole 84 through which the crank portion 28 fits through in order that the knob 29 is accessible from outside the casing 83.

Since the light shielding plate groups 21, 31 are arranged beside the focusing plate 61 and a driving mechanism such as the interlocking arm 41 is arranged along the side portion of the erecting mirror unit 81, the viewing area changing mechanism 10 can be made compact and does not enlarge the size of a camera.

Further, the present invention is not limited to a finder system having viewing areas corresponding to the normal and panoramic modes, but can also be applied to another type of finder system having viewing areas corresponding to an exposure area having a 16:9 aspect ratio or a 2:1 aspect ratio (i.e., a half size exposure area).

Still further, the number of plates is not limited to three for each of the light shielding plate groups, but may be any number. In the embodiment described above the plates are opaque. However, the plates may be made of material which allows some transmission of light. When a plate allowing half the light to pass through is used, it is easy to compare framing in the panoramic mode with framing in the normal mode, since the top and bottom peripheral areas of the viewing area is gray.

Although the viewing area changing mechanism is manually actuated by a user in the above-mentioned embodiment, it can also be automatically actuated by a driving mechanism connected to an exposure mode changing device.

As described above, a viewing area of a finder of an SLR camera can be changed using the viewing area changing mechanism of the present invention. Further, the space occupied by the finder is not increased since the light shielding plates overlap each other thereby fitting in an area below the field frame of the finder system. This allows an SLR camera that can operate in a panoramic mode to reduce the size of the finder system, while still providing the necessary frame size information to the photographer.

The present disclosure relates to subject matter contained in Japanese patent application No. H5-320482 filed on Dec.

20, 1993, which is expressly incorporated herein by reference in its entirety.

What is claimed is:

1. A finder system of a single lens reflex camera, said finder system comprising:

a field frame for defining a viewing area of said finder system when said camera is in a normal photographing mode;

means for shading a predetermined portion of said viewing area of said finder system when said camera is in a panoramic photographing mode, said shading means comprising two groups each comprising a plurality of light shielding plates; and a slider for changing said camera from said normal photographing mode to said panoramic photographing mode, said slider moving at least a first of said plurality of light shielding plates of one of said two groups of light shielding plates, said slider being accessible from outside a casing of said camera, wherein at least one of said plurality of light shielding plates of each of said two groups completely overlap another of said plurality of light shielding plates of said each of said two groups and overlap said field frame, said plurality of light shielding plates of each of said two groups disposed out of said viewing area when said camera is in said normal photographing mode, and when said camera is in said panoramic photographing mode, said plurality of light shielding plates are moved such that said plurality of light shielding plates partially overlap each other, changing a size of said viewing area to correspond to a panoramic photographing size.

2. The finder system according to claim 1, wherein an aspect ratio of said viewing area is similar to an aspect ratio of said exposure frame size.

3. The finder system according to claim 1, wherein when said slider changes said camera from said normal photographing mode to said panoramic photographing mode, each of said two groups of said plurality of light shielding plates moving synchronously from said completely overlapped condition to said partially overlapped condition.

4. The finder system according to claim 2, wherein said mode slider comprises means for interlocking said light shielding plate groups so that each of said plurality of light shielding plates is moved symmetrically.

5. The finder system according to claim 1, wherein said slider further comprises an interlocking arm which mechanically connects said at least first of said light shielding plates of said one of said two groups with at least a second light shielding plate of the other of said two groups, where when said slider is moved, said first light shielding plate and said second light shielding plate are moved synchronously.

6. The finder system according to claim 1, wherein at least said first of said light shielding plates of said one of said two groups comprises an engaging pin, said engaging pin contacting at least a remaining one of said plurality of light shielding plates in said one of said two groups, wherein when said first light shielding plate is moved a first predetermined distance, said engaging pin moves said at least one of said remaining one of said plurality of light shielding plates in said one of said two groups.

7. The finder system according to claim 1, wherein said light shielding plates are cantilevered.

8. The finder system according to claim 1, said changing means comprising means for moving said light shielding plates in a direction to change a dimension of first opposing sides of said viewing area while not changing a dimension of second opposing sides of said viewing area, said first and second opposing sides extending transverse to each other.

9. The finder system according to claim 1, each of said two groups of said plurality of light shielding plates are moved in a direction towards each other when said changing means changes said camera from said normal photographing mode to said panoramic photographing mode, and each of said two groups of said plurality of light shielding plates are moved in a direction away from each other when said changing means changes said camera from said panoramic photographing mode to said normal photographing mode.

10. A finder system of a single lens reflex camera, a viewing area of said finder system adjustable between first and second predetermined viewing sizes by light shading means, said light shading means comprising a first and second groups of cantilevered light shielding plates stacked one on top of another;

said shading means further comprising means for moving said light shielding plates in a direction to change a dimension of first opposing sides of said viewing area while not changing a dimension of second opposing sides of said viewing area, said first and second opposing sides extending transverse to each other, and wherein when said viewing area has said second predetermined viewing size, each of said light shielding plates of said first group partially overlap each other, and each of said light shielding plates of said second group partially overlap each other.

11. The finder system according to claim 10, wherein a first light shielding plate of said first group and a second light shielding plate of said second group each have an engaging pin, wherein the other light shielding plates of each of said first and second group have engaging holes, wherein said finder system further comprises means for changing said size of said viewing area, and wherein when said size of said viewing area is changed, said first and second light shielding plates are moved such that said engaging pin engages said engaging holes of said other light shielding plates, thereby moving said other light shielding plates.

12. The finder system according to claim 11, wherein said viewing area size changing means comprises an actuation knob to move at least said first light shielding plates of each of said first and second groups of light shielding plates, wherein said knob is accessible from outside a casing of said camera.

13. The finder system according to claim 12, wherein said viewing area size changing means further comprises an interlocking arm which mechanically connects said first light shielding plate of said first group with said second light shielding plate of said second group, wherein when said knob is moved, said first light shielding plate and said second light shielding plate are moved synchronously.

14. The finder system according to claim 10, said first and second groups of said plurality of light shielding plates are moved in a direction towards each other when said changing means changes said camera from said first predetermined sized to said second predetermined size, and said first and second groups of said plurality of light shielding plates are moved in a direction away from each other when said changing means changes said camera from said second predetermined size to said first predetermined size.

15. The finder system of claim 10, wherein when said viewing area has said first predetermined viewing size, each of said light shielding plates of said first group completely and each of said light shielding plates of said second group completely overlap with a field frame.

16. A finder system of a single lens reflex camera, said finder system comprising:

a field frame for defining a viewing area of said finder system when said camera is in a normal photographing mode;

a first and second group of light shielding plates for shielding a predetermined portion of said viewing area of said finder system when said camera is in a panoramic photographing mode;

an actuation knob to move at least a first of said plurality of light shielding plates of said first group to change said camera from said normal photographing mode to said panoramic photographing mode; and an interlocking arm mechanically connecting said first of said plurality of light shielding plates of said first group to a first of said plurality of light shielding plates of said second group, wherein when said knob is moved, said first of said plurality of light shielding plates of said first group and said first of said plurality of light shielding plates of said second group are moved synchronously between said normal photographing mode and said panoramic photographing mode viewing areas.

17. The finder system of claim 16, said first light shielding plate of said first group comprises a first engaging pin, said first engaging pin contacting the remaining light shielding plates in said first group, and said first light shielding plate of said second group comprises a second engaging pin, said second engaging pin contacting the remaining light shielding plates in said second group, wherein when said first light shielding plate of said first group and said second group are moved, said first engaging pin and said second engaging pin move at least one of said remaining light shielding plates in each of said first group and said second group.

18. The finder system of claim 16, wherein said light shielding plates of said first group and said second group completely overlap each other and are disposed out of said viewing area when said camera is in said normal photographing mode, and when said camera is in said panoramic photographing mode, said light shielding plates of said first group and said second group partially overlap each other.

* * * * *